United States Patent [19]
Wu

[11] Patent Number: 5,103,867
[45] Date of Patent: Apr. 14, 1992

[54] ACTIVE REED VALVE

[75] Inventor: Ko-Jen Wu, Troy, Mich.

[73] Assignee: General Motors Corporation, Detroit, Mich.

[21] Appl. No.: 724,239

[22] Filed: Jul. 1, 1991

[51] Int. Cl.$^5$ .................. F16K 15/16; F16K 15/18
[52] U.S. Cl. .................. 137/601; 123/52 MF; 137/512.1; 137/599.2; 137/855
[58] Field of Search ............... 123/52 MF; 137/512.1, 137/599.2, 601, 855

[56] References Cited

U.S. PATENT DOCUMENTS

| | | | |
|---|---|---|---|
| 3,167,059 | 1/1965 | Love | 123/75 |
| 3,935,842 | 2/1976 | Ishizawa et al. | 123/52 |
| 4,422,416 | 12/1983 | Bernardoni | 123/52 |
| 4,796,584 | 1/1989 | Goto et al. | 123/403 |
| 4,955,329 | 9/1990 | D'Angelo et al. | 123/52 |
| 5,018,486 | 5/1991 | Davis et al. | 123/52 |

FOREIGN PATENT DOCUMENTS

| | | |
|---|---|---|
| 3733441 | 12/1988 | Fed. Rep. of Germany . |
| 3822005 | 1/1989 | Fed. Rep. of Germany . |
| 1453072A1 | 1/1989 | U.S.S.R. . |
| 1456623 | 2/1989 | U.S.S.R. . |

OTHER PUBLICATIONS

SAE Paper 905159, "Application of Reed Valves to Four Cycle Spark Ignition Engine", by A. Piccone, D. D'Angelo, May 1990, pp. 325-331.

Automotive Engineering, Nov. 1988, vol. 96, No. 11, pp. 109-110.
Automotive Engineering, Aug. 1988, vol. 96, No. 8, pp. 87-88.
Turin Motor Show, Alfa Romeo Engines, Ing. Jacoponi's speech, 19 Apr. 1988.
Alfa Romeo Motori Torino 19/4/1988 (copies of eleven photographs attached).
Research Disclosure 301111, May 1989.

Primary Examiner—Gerald A. Michalsky
Attorney, Agent, or Firm—Gordon F. Belcher

[57] ABSTRACT

An active reed valve for a fluid passage comprising a sealing means sealingly fixed to the passage walls, and a primary petal seat having a primary seat port and a downstream primary seat end. A flexible primary petal is sealingly attached to the primary petal seat in a cantilevered manner. The primary petal seat and a primary baffle are sealingly attached to the sealing means. The primary baffle is spaced apart from the primary petal seat so that fluid can flow between the primary baffle and petal seat. A positioning means enables the primary baffle to sealingly engage the primary seat wherein fluid flow between the primary baffle and petal seat is directed by the primary baffle toward the primary seat port. Fluid flow through the primary seat port is allowed by the primary petal flexing away from the primary petal seat and fluid back-flow is obstructed by seating of the primary petal on the primary petal seat. The positioning means further enables adjustable separation between the downstream primary baffle end and downstream primary seat end.

8 Claims, 2 Drawing Sheets

ACTIVE REED VALVE

Technical Field

This invention relates to a reed valve for use in an engine and, more particularly, to an active reed valve which can be adjustably opened and closed depending on the engine operating condition.

Background

Reed valves can be located in an intake passage leading to a cylinder of an engine to obstruct back-flow of fluids out of the cylinder into the intake passage. Such reed valves typically cause a pressure drop in the fluid flowing through them towards the cylinder due to a number of factors. First, the support structure of the reed valve produces a reduction in the flow area of the intake passage. Second, a reed valve typically has a flexible petal which obstructs fluid back-flow and must ordinarily be deflected by the fluid flowing toward the cylinder in order for the fluid to flow through the reed valve.

The fluid back-flow from the cylinder into the intake passage, which the reed valve is designed to obstruct, is ordinarily greatest during low engine speeds. Therefore, the anti-reversion feature of the reed valve is most beneficial during low engine speeds, and this benefit can outweigh the detrimental effects of the pressure drop produced by the reed valve. Thus, during low engine speeds, the reed valve can produce a net benefit.

During high engine speeds, there is ordinarily less fluid back-flow from the cylinder into the intake passage which the reed valve is intended to obstruct. However, during these engine speeds, the pressure drop in the fluid flow toward the cylinder caused by the reed valve can be substantial. The detrimental effect of the pressure drop can, therefore, be greater than the benefit of the anti-reversion feature of the reed valve during high engine speed. Thus, during high engine speeds, the net effect of the reed valve can be detrimental to the fluid flow through the intake passage into the cylinder.

In order to obtain the net beneficial effect of reed valves during low engine speeds, and avoid the net detrimental effect during high engine speeds, reed valves can be constructed so that they can be moved into and out of an intake passage depending on the engine operating conditions. Such movable reed valves, however, typically provide limited control of the direction of the fluid flow downstream of the movable reed valve. Such control can be particularly desirable if the intake passage is curved immediately downstream of the movable reed valve. Also, such movable reed valves typically have a limited number of petals which usually results in the petals having a reduced responsiveness to changes in the pressure difference across the movable reed valve or re duced petal strength.

Summary of the Invention

The present invention provides an active reed valve for a fluid passage comprising a sealing means sealingly fixed to the passage walls, and a primary petal seat having a primary seat port and a downstream primary seat end. A flexible primary petal is sealingly attached to the primary petal seat in a cantilevered manner. The primary petal seat and a primary baffle are sealingly attached to the sealing means. The primary baffle is spaced apart from the primary petal seat so that fluid can flow between the primary baffle and petal seat. A positioning means enables the primary baffle to sealingly engage the primary seat wherein fluid flow between the primary baffle and petal seat is directed by the primary baffle toward the primary seat port. Fluid flow through the primary seat port is allowed by the primary petal flexing away from the primary petal seat and fluid back-flow is obstructed by seating of the primary petal on the primary petal seat. The positioning means further enables adjustable separation between the downstream primary baffle end and downstream primary seat end.

The ability of the positioning means to cause the downstream primary baffle end to engage the downstream seat end enables the active reed valve to obstruct fluid back-flow from the cylinder into the intake passage. The ability of the positioning means to produce substantial separation between the downstream primary baffle and seat ends makes it possible to align the primary petal seat and baffle in the intake passage so that their sides coincide with the direction of the fluid flow in the intake passage toward the cylinder resulting in a minimal pressure drop produced by the active reed valve.

The ability of the positioning means to adjustably separate the downstream primary baffle and seat ends allows at least some of the fluid flowing through the active reed valve to the cylinder to bypass the primary seat port and flow between the downstream primary seat and baffle ends. This reduces the pressure drop produced by the active reed valve since at least a portion of the fluid flow can bypass the primary seat port and thereby avoid having to deflect the primary petal. If the separation between the downstream primary baffle and seat ends is limited, then the active reed valve can still provide some obstruction to fluid back-flow since some of the fluid back-flow may not be able to flow upstream between the downstream primary seat and baffle ends.

The primary baffle enables control of the direction of the fluid flow exiting the active reed valve. This can be especially advantageous if the intake passage is curved immediately downstream of the active reed valve.

The active reed valve can be adapted to have a plurality of petal seats, petals and baffles enabling each petal to have a smaller size. This can result in the petals havinq an increased responsiveness to changes in the pressure difference across the active reed valve, and increased petal strength.

These and other features and advantages of the invention will be more fully understood from the following description of certain specific embodiments of the invention taken together with the accompanying drawings.

BRIEF DRAWING DESCRIPTION

In the drawings.

Corresponding reference characters indicate corresponding parts throughout the several views of the drawings.

DETAILED DESCRIPTION

Figure 1:
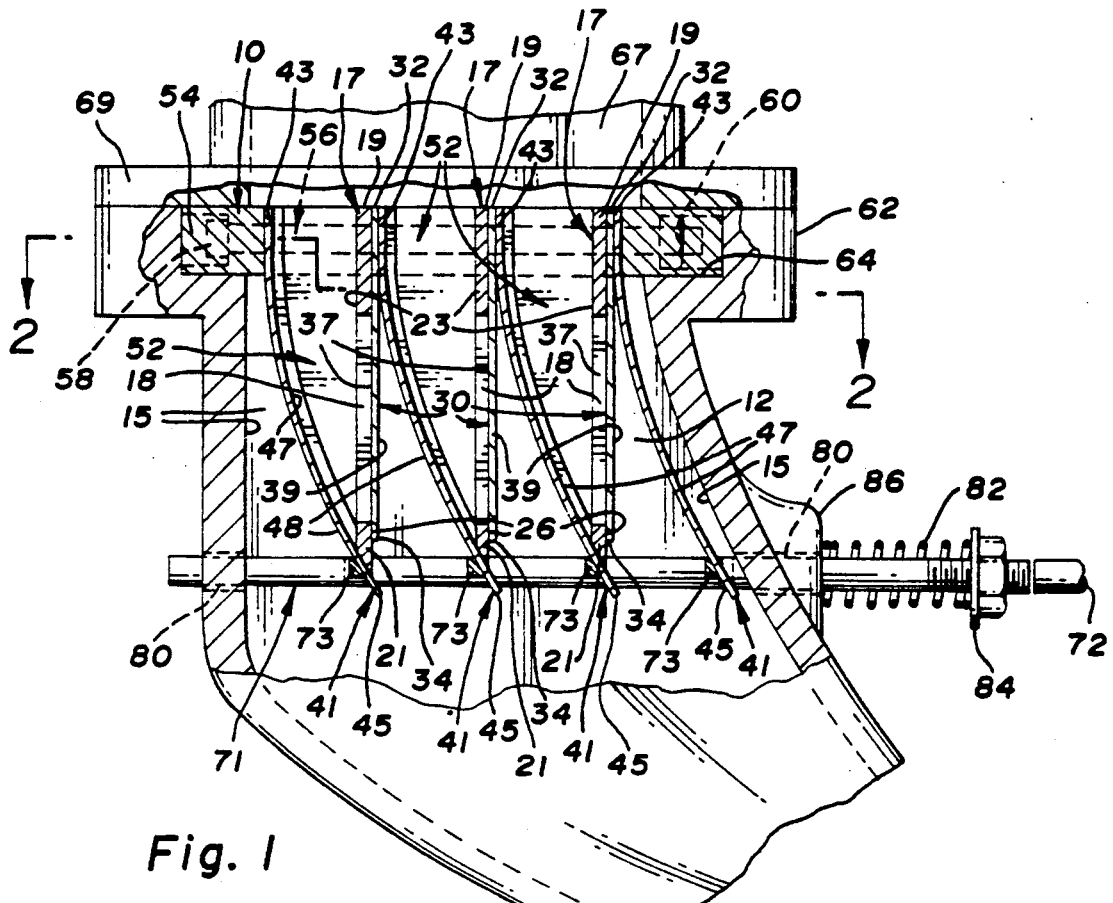
FIG. 1 is a side elevational view showing an active reed valve of the present invention mounted in a fluid passage with portions of the fluid passage being broken away to show the active reed valve in the closed position.

Referring to the drawings, and in particular, FIG. 1, numeral 10 generally refers to an active reed valve of the present invention mounted in a fluid passage 12. The fluid passage 12 is defined by passage walls 15. The fluid passage 12 is curved immediately downstream of the active reed valve 10.

Figure 2:
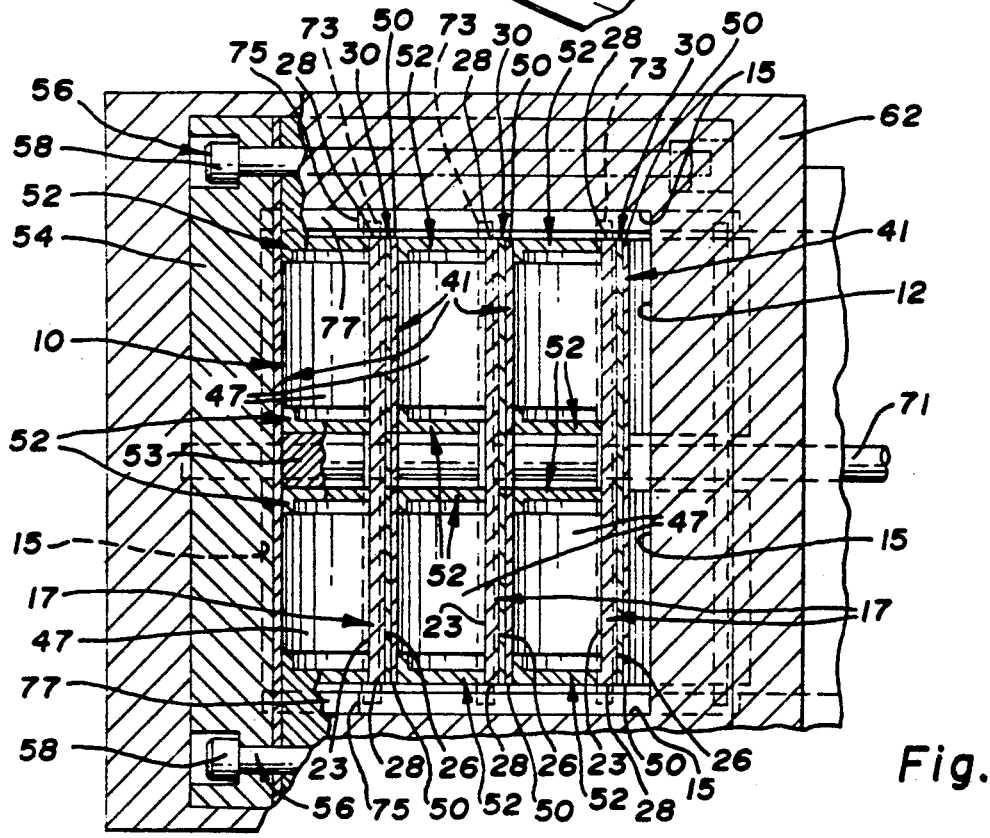
FIG. 2 is a sectional plan view of the active reed valve generally in the plane indicated by line 2—2 of FIG. 1 showing the upstream ends of the baffles, petal seats and petals, and the arm links on the link seats.

The active reed valve 10 includes a sealing means comprising triangular shaped divider plates 52 located in the fluid passage 12 as shown in FIGS. 1 and 2. The divider plates 52 are positioned so that they point downward with their long straight edges lying in one of three parallel vertical planes. Seal spacers 53 are sealingly connected between the upper ends of the central divider plates 52, as shown in FIG. 2. The seal spacers 53 obstruct fluid flow between the central divider plates 52.

The active reed valve 10 comprises a plurality of petal seats generally designated by numeral 17. Each petal seat 17 includes a seat port 18, upstream and downstream seat ends 19,21, upstream and downstream seat sides 23,26 and seat side edges 28, as shown in FIGS. 1 and 2. Each petal seat 17 is fixed with respect to the passage walls 15. Each upstream petal seat end 19 is sealingly attached to a divider plate 52 enabling fluid to flow from the upstream to the downstream seat sides 23,26 through the seat port 18.

The active reed valve 10 further comprises a plurality of flexible petals generally designated by the numeral 30 and corresponding in number to the number of petal seats 17. Each petal 30 comprises upstream and downstream petal ends 32,34, and upstream and downstream petal sides 37,39. Each petal 30 is sealingly attached to a downstream seat side 26 adjacent to the upstream seat end 19, as shown in FIG. 1, so that it overlies the seat port 18 and can flex away from the downstream seat side in a cantilevered manner.

The active reed valve 10 includes a plurality of flexible baffles generally designated by the numeral 41 and corresponding in number to the number of petal seats 17. Each baffle 41 comprises upstream and downstream baffle ends 43, 45, upstream and downstream baffle sides 47, 48 and baffle side edges 50. Each upstream baffle end 43 is sealingly attached to a divider plate 52 with the upstream baffle side 47 facing an upstream seat side 23. Each upstream baffle end 43 is spaced apart from the adjacent upstream seat end 19. Each baffle 41 is oriented with respect to the passage walls 15 to enable control of the fluid flow direction with respect to the passage walls 15 and petal seats 17.

The longest side of the divider plate 52 is curved and provides a stop to limit the displacement of the baffles 41 in the direction toward the petal seats 17, as shown in FIG. 1. The divider plates 52 furthest from the seat and baffle side edges 28,50 provide additional support to limit the displacement of the baffles 41.

One of the petal seats 17, and the petal 30 and baffle 41 between which the petal seat is disposed, may constitute a primary petal seat, petal and baffle. A secondary baffle 41 is then defined by the baffle which adjoins the primary petal 30. The secondary petal seat 17 is defined by the petal seat which faces the upstream secondary baffle side 47, and the secondary petal 30 is defined by the petal which is attached to the downstream secondary seat side 26.

The sealing means further includes a support frame 54 on which the baffles 41, petal seats 17, petals 30 and divider plates 52 are mounted, as shown in FIG. 1. The support frame 54 is generally rectangular as shown in FIG. 2 and has a pair of frame bolts 56 which extend through the upstream baffle, seat and petal ends 43,19,32 adjacent to the seat and baffle side edges 28,50. A third frame bolt may extend through the upstream baffle, seat and petal ends 43,19,32 midway between the frame bolts 56 which are adjacent to the seat and baffle side edges 28,50. Each frame bolt 56 has an expanded bolt head 58 and a bolt nut 60 seated in recesses in the support frame 54. The frame bolts 56 are thereby held in the support frame 54.

The connection of the baffles 41, petal seats 17, petals 30 and divider plates 52 to the support frame 54 results in a modular assembly which is dropped into a frame seat 64. The frame seat 64 is constituted by a recess formed in a support flange 62 which is formed in the upper end of the passage walls 15. An upstream runner flange 69 is formed in the lower end of the upstream runner 67 and attached to the support flange 62 to contain the support frame 54 in sealing engagement with the frame seat 64.

Figure 3:
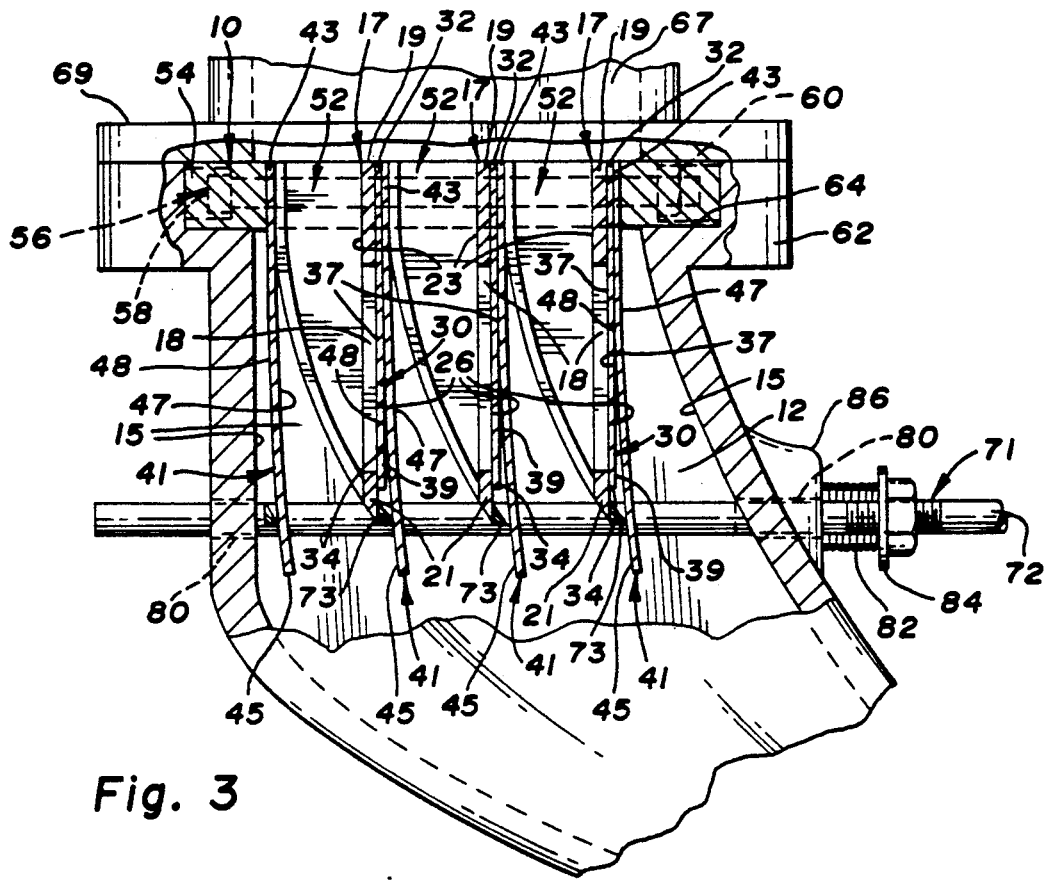
FIG. 3 is a view corresponding to FIG. 1 showing the active reed valve in the open position.

A positioning means comprises an actuator rail 71 which extends through openings in the passage walls 15 which face the upstream and downstream baffle sides 47,48. Each of the downstream seat and baffle ends 21,45 has a notch formed therein through which the actuator rail 71 extends. This enables the downstream seat and baffle ends 21,45 to extend below the actuator rail 71, as shown in FIGS. 1 and 3.

The actuator rail 71 is axially aligned with an actuator driver 72. The actuator driver 72 can be axially displaced to axially displace the actuator rail 71. The actuator driver 72 may comprise a stepper motor, solenoid, hydraulic or pneumatic mechanism. The actuator driver 72 may become disengaged from the actuator rail 71 when the actuator rail is displaced the maximum amount toward the actuator driver.

Cylindrical seals 80 are disposed between the actuator rail 71 and the opening in the passage walls 15. The cylindrical seals 80 allow axial displacement of the actuator rail 71 with respect to the passage walls 15.

Driver arms 73 are seated in notches in the actuator rail 71, and are pe rpendicular to the actuator rail and parallel to the downstream petal ends 34. The cross section of each driver arm 73 has a beveled surface which mates with the opposing downstream baffle side 48. Axial displacement of the actuator rail 71 thereby causes displacement of the downstream baffle ends 45 with respect to the downstream seat ends 21, via the driver arms 73.

The ends of the driver arms 73 which are adjacent to the seat and baffle side edges 28,50 extend into arm links 75 and are thereby connected to one another. Each arm link 75 is seated on a link seat 77 comprising a step formed in the passage walls 15, as shown in FIGS. 1 and 2. The portion of the fluid passage 15 between the link seat 77 and support flange 62 has a cross section in the direction of the driver arms, which is larger than the length of the driver arms 73, as shown in FIG. 2. This enables the driver arms 73, with the arm links 75 attached thereto, to be dropped, from above, into notches formed in the actuator rail 71. The arm links 75 facilitate maintenance of the same spacing between the ends of the driver arms 73 as the spacing between the engagements between the driver arms and actuator rail 71.

A driver spring 82 is compressed between a passage shoulder 86 formed on the exterior surface of the passage wall 15 and a driver collar 84 fixed to the actuator rail 71. Compression of the driver spring 82 causes the driver collar 84 to be ur9ed away from the passage shoulder 86 thereby causin9 the actuator driver 71 to displace the downstream baffle ends 45 toward the downstream seat ends 21.

In operation, the actuator rail 71 enables the position of each downstream baffle end 45 to be varied between open and closed positions. In the closed position, as shown in FIG. 1, the actuator rail 71 is positioned so that each downstream baffle end 45 sealingly engages a downstream seat end 21, and the associated baffle side edges 28,50 sealingly engage a divider plate 52. The corner formed in each divider plate 52, as shown in FIG. 2, increases the surface area of the divider plate engaged by the respective baffle 41 thereby enhancing the seal between them. The displacement of the actuator rail 71 toward the closed position is limited by the engagement between the downstream seat and baffle ends 21,45, as shown in FIG. 1.

In the open position, as shown in FIG. 3, the actuator rail 71 is positioned so that each downstream baffle end 45 has the maximum displacement from the downstream seat end 21 to which it engages when in the closed position, and the associated baffle side edges 50 have the maximum displacement from the divider plate 52 to which they engage when in the closed position. The displacement of the actuator rail 71 toward the open position is limited by the compression of the driver spring 82, as shown in FIG. 3, and the engagement between the driver arms 73 and downstream seat sides 26. The size of the cross section of the fluid passage 12 above the link seats 77 allows displacement of the arm links in the fluid passage when the aotuator rail 71 is moved between the open and closed positions.

The fluid flowing through the fluid passage 12 toward the cylinder enters the active reed valve 10 adjacent the upstream seat, petal and baffle ends 19,32,43 between respective pairs of upstream seat and baffle sides 23,47. When the active reed valve 10 is in the closed position, each upstream baffle side 47 directs the fluid flow toward the upstream seat side 23 facing it. If the fluid pressure adjacent each upstream petal side 37 is sufficiently greater than the fluid pressure adjacent the contiguous downstream petal side 39, then the petal 30 deflects away from the adjoining downstream seat side 26 allowing the fluid to flow through the seat port 18. If the fluid pressure adjacent each upstream petal side 37 is not sufficiently greater than the fluid pressure adjacent the contiguous downstream petal side 39, then the petal 30 seats against the adjoining downstream seat side 26 obstructing fluid flow through the seat port 18 in the reverse direction.

During low engine speeds, the active reed valve 10 is ordinarily in the closed position. When in the closed position, the active reed valve 10 provides the maximum obstruction to fluid back-flow, which is ordinarily greatest during these engine operating conditions. The pressure drop in the fluid flow caused by the resistance of the petals 30 to deflection is greatest with the active reed valve 10 in the closed position. However, this pressure drop is somewhat mitigated by the low rate of fluid flow during these engine operating conditions.

During high engine speeds, the active reed valve 10 is ordinarily in the open position which results in the minimum obstruction to fluid back-flow. During these engine operating conditions, the fluid back-flow is ordinarily minimal. The separation between the downstream seat and baffle ends 21,45 also enables the fluid flow toward the cylinder to bypass the seat ports 18 and flow between the downstream seat and baffle e nds 21,45. The pressure drop produced by the resistance of the petals 30 to deflection is therefore very small and can possibly be eliminated. During these engine operating conditions, the substantial rate of fluid flow can result in a substantial pressure drop if the fluid is forced to flow through the seat ports 18 and deflect the petals 30 away from the petal seats 17.

During intermediate engine speeds, the active reed valve 10 is positioned between the open and closed positions. This enables portions of the fluid flow toward the cylinder to bypass the seat ports 18 thereby reducing the pressure drop in the fluid caused by the resistance of the petals 30 to deflection. Similarly, portions of the fluid back-flow can bypass the seat ports 18 and flow between the downstream seat and baffle ends 21,45 while other portions of the fluid back-flow are obstructed by the petals 30 and petal seats 17 thereby partially obstructing the fluid back-flow.

Figure 4:
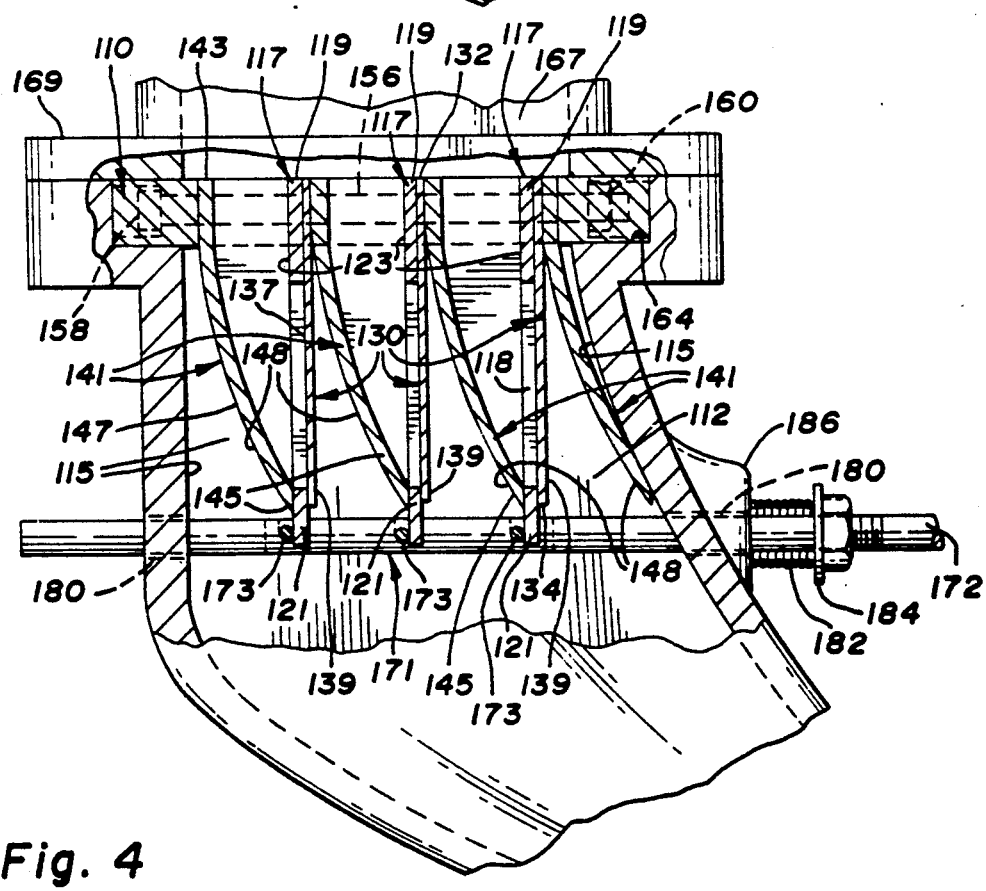
FIG. 4 is a view corresponding to FIG. 1 showing a second embodiment of the active reed valve in the closed position.

The baffles 41 facilitate control of the direction of the fluid flow through the active reed valve 10. This is especially useful if the fluid passage 10 is curved immediately downstream of the active reed valve 10, as shown in FIGS. 1, 3 and 4. The baffles 41 facilitate control of the fluid flow direction even when the downstream seat and baffle ends 21,45 are separated. The baffles 41 also serve as stops for limiting the deflection of the petals 30. It is possible to include an additional baffle 41 between the passage wall 15 and the petal 30 closest to the passage shoulder 86, as shown in FIGS. 1 and 3, to provide a stop for this petal 30. The baffles 41 which are disposed between the petals 30 serve as both stops and means for controlling the direction of the fluid flow through the fluid passage 12.

FIG. 4 shows a second embodiment of the active reed valve lOO. Parts similar to those shown in FIGS. 1-3 have the same reference numeral with the addition of the prefix 100. In this embodiment, the petal seat 117 is made of a flexible material. Each driver arm 173 engages an upstream seat side 123 adjacent the downstream seat end 121. The baffles 141 are fixed with respect to the passage walls 115. The driver arms 173 enable displacement of the downstream seat ends 121 with respect to the downstream baffle ends 145. The downstream seat ends 121 can thereby be controllably separated from the downstream baffle ends 145. The displacement of the actuator rail 171 toward the closed position is limited by the engagement between the downstream seat and baffle ends 121,145 and the compression of the driver spring 182, as shown in FIG. 4. The displacement of the actuator rail 171 toward the open position is limited by the engagement between the downstream petal and baffle sides 139,148.

While the active reed valves 10,110, shown in FIGS. 1-4, have a plurality of petal seats 17,117, petals 30,130, and baffles 41,141, it is possible for the active reed valves to include a single petal seat, petal and baffle.

While the invention has been described by reference to ce rtain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. An active reed valve for a fluid passage defined by passage walls, said reed valve comprising:
   a sealing means sealingly fixed to the passage walls;
   a primary petal seat having a primary seat port, an upstream primary seat end, a downstream primary seat end, an upstream primary seat side, a downstream primary seat side and primary seat side edges, said upstream primary seat end being sealingly attached to said sealing means enabling fluid to flow from said upstream primary seat side to said downstream primary seat side through said primary seat port;
   a flexible primary petal sealingly attached to said downstream primary seat side in a cantilevered manner adlaoent to saId upstream primary seat end wherein said primary petal overlies said primary seat port, said primary petal being adapted to flex away from said downstream primary seat side to uncover said primary seat port;
   a primary baffle having an upstream primary baffle end, a downstream primary baffle end, an upstream primary baffle side, a downstream primary baffle side, and primary baffle side edges, said upstream primary baffle end being sealingly attached to said sealing means, said upstream primary baffle side facing said upstream primary seat side, said upstream primary baffle end being spaced apart from said upstream primary seat end so that fluid can flow between said upstream primary baffle side and upstream primary seat side, said primary baffle being oriented with respect to the passage walls enabling control of the fluid flow direction with respect to the passage walls; and
   a positioning means enabling said downstream primary baffle end to sealingly engage said downstream primary seat end, said positioning means enabling said primary seat side edges and primary baffle side edges to sealingly engage said sealing means wherein fluid flow from said upstream primary seat end to said downstzeam primary seat end between said primary baffle and petal seat is directed by said primary baffle toward said primary seat port, fluid flow through said primary seat port being allowed by said primary petal flexing away from said primary petal seat and fluid back-flow in the reverse direction toward said primary seat port being obstructed by seating of said primary petal on said primary petal seat, said positioning means further enabling adjustable separation between said downstream primary baffle end and downstream primary seat end.

2. An active reed valve as set forth in claim 1 wherein said primary petal seat is fixed with respect to the passage walls.

3. An active reed valve as set forth in claim 1 wherein said primary baffle is fixed with respect to the passage walls.

4. An active reed valve as set forth in claim 1, in combination with an intake passage in which said active reed valve is mounted, said intake passage being curved immediately downstream of said active reed valve.

5. An active reed valve as set forth in claim 1 wherein said primary petal has an upstream primary petal end, a downstream primary petal end, an upstream primary petal side and a downstream primary petal side, said active reed valve further comprising:
   a secondary petal seat having a secondary seat port, an upstream secondary seat end, a downstream secondary seat end, an upstream secondary seat side, a downstream secondary seat side and secondary seat side edges, said upstream secondary seat end being sealingly attached to said sealing means enabling fluid to flow from said upstream secondary seat side to said downstream secondary seat side through said secondary seat port;
   a flexible secondary petal sealingly attached to said downstream secondary seat side in a cantilevered manner adjacent to said upstream secondary seat end wherein said secondary petal overlies said secondary seat port, said secondary petal being adapted to flex away from said downstream secondary seat side to uncover said secondary seat port;
   a secondary baffle havin9 an upstream secondary baffle end, a downstream secondary baffle end, an upstream secondary baffle side, a downstream secondary baffle side, and secondary baffle side edges, said upstream secondary baffle end being sealingly attached to said sealing means, said downstream secondary baffle side adjoining said downstream primary petal side, said upstream secondary baffle side facing said upstream secondary seat side, said upstream secondary baffle end being spaced apart from said upstream secondary seat end so that fluid can flow between said upstream secondary baffle side and upstream secondary seat side, said secondary baffle being oriented with respect to the passage walls enabling control of the fluid flow direction with respect to the passage walls,
   wherein said positioning means enables said downstream secondary baffle end to sealingly engage said downstream secondary seat end, said positinoiong means enabling said secondary seat side edges and secondary baffle side edges to sealingly engage said sealing means wherein fluid flow from said upstream secondary seat end to said downstream secondary seat end between said secondary baffle and petal seat is directed by said secondary baffle toward said secondary seat port, fluid flow through said secondary seat port being allowed by said secondary petal flexing away from said secondary petal seat and fluid back-flow in the reverse direction toward said secondary seat port being obstructed by seating of said secondary petal on said secondary petal seat, said positioning means further enabling adjustable separation between said downsteram secondary baffle end and downstream secondary seat end.

6. An active reed valve as set forth in claim 5 wherein said primary petal seat and secondary petal seat are fixed with respect to the passage walls, and said positioning means comprises an actuator rail which engages said primary baffle end and secondary baffle end, said actuator rail being movable with respect to the passage walls enabling said adjustable separation between said downstream primary baffle end and downstream primary seat end, and between said downstream secondary baffle end and downstream secondary seat end.

7. An active reed valve as set forth in claim 5 wherein said primary baffle and secondary baffle are fixed with respect to the passage walls, and said positioning means comprises an actuator rail which engages said primary petal seat end and secondary petal seat end, said actuator rail being movable with respect to the passage walls enabling said adjustable separation between said downstream primary baffle end and downstream primary seat and, and between said downstream secondary baffle end and said downstream secondary seat end.

8. An active reed valve as set forth in claim 5, in combination with an intake passage in which said active reed valve is mounted, said intake passage being curved immediatley downstream of said active reed valve.

* * * * *